United States Patent
Kawaguchi

(10) Patent No.: US 11,297,476 B2
(45) Date of Patent: Apr. 5, 2022

(54) COMMUNICATION DEVICE AND METHOD OF CONTROLLING COMMUNICATION DEVICE

(71) Applicant: TOYOTA JIDOSHA KABUSHIKI KAISHA, Toyota (JP)

(72) Inventor: Keizoh Kawaguchi, Okazaki (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 90 days.

(21) Appl. No.: 16/570,141

(22) Filed: Sep. 13, 2019

(65) Prior Publication Data
US 2020/0145802 A1 May 7, 2020

(30) Foreign Application Priority Data
Nov. 1, 2018 (JP) .............................. JP2018-206644

(51) Int. Cl.
*H04W 4/60* (2018.01)
*H04W 4/02* (2018.01)
*H04W 4/029* (2018.01)
*H04W 4/44* (2018.01)

(52) U.S. Cl.
CPC ............. *H04W 4/60* (2018.02); *H04W 4/027* (2013.01); *H04W 4/029* (2018.02); *H04W 4/44* (2018.02)

(58) Field of Classification Search
CPC ....... H04W 4/027; H04W 4/029; H04W 4/44; H04W 4/60; H04W 8/18
See application file for complete search history.

(56) References Cited

U.S. PATENT DOCUMENTS

| | | | | |
|---|---|---|---|---|
| 2012/0302262 A1* | 11/2012 | Bruce | ..................... | H04W 4/50 455/456.6 |
| 2014/0031023 A1* | 1/2014 | Schraut | ................. | H04W 8/245 455/418 |
| 2015/0358798 A1 | 12/2015 | Okawa et al. | | |
| 2020/0065917 A1* | 2/2020 | Kurihara | .................. | G08G 1/00 |
| 2020/0106836 A1* | 4/2020 | Takehara | ................ | B60R 25/33 |

FOREIGN PATENT DOCUMENTS

| | | |
|---|---|---|
| JP | 2017-195455 | 10/2017 |
| JP | 2018-121148 | 8/2018 |
| WO | WO 2014/112149 A1 | 7/2014 |

* cited by examiner

*Primary Examiner* — Kevin C. Harper
*Assistant Examiner* — Derrick V Rose
(74) *Attorney, Agent, or Firm* — Oblon, McClelland, Maier & Neustadt, L.L.P.

(57) ABSTRACT

In a communication device mounted in a vehicle, a communication unit performs wireless communication using any one of a plurality of profiles for using a wireless communication network. A first acquisition unit acquires travel information of the vehicle. A second acquisition unit acquires position information of the vehicle. A controller controls whether or not to execute a profile determination process based on the acquired travel information and the acquired position information.

5 Claims, 3 Drawing Sheets

COMMUNICATION DEVICE AND METHOD OF CONTROLLING COMMUNICATION DEVICE

INCORPORATION BY REFERENCE

The disclosure of Japanese Patent Application No. 2018-206644 filed on Nov. 1, 2018 including the specification, drawings and abstract is incorporated herein by reference in its entirety.

BACKGROUND

1. Technical Field

The present disclosure relates to a communication device that performs wireless communication using any one of a plurality of profiles, and a method of controlling the communication device.

2. Description of Related Art

In recent years, a system that performs wireless communication between a communication device mounted in a vehicle and a server has been used. The communication device performs communication over a wireless communication network of a communication carrier specified from profile information registered in a mounted subscriber identity module (SIM) card, based on the profile information. A technology for providing a plurality of SIM cards and changing a wireless communication network with the communication carrier according to a situation using any one of the SIM cards is known.

International Publication No. 2014/112149 discloses a telematics controller that includes a SIM switching unit that enables communication of any one of a plurality of SIM interfaces (SIM cards) and instructs the SIM switching unit to switch to the SIM interface associated with vehicle information such as the presence or absence of a generated emergency notification signal according to the vehicle information.

SUMMARY

Generally, vehicles produced in a producing country are transported to a service country by a ship or vehicle carrier via a transit country and sold in a service country. In order to cope with a situation in which vehicles are sold in any one of a plurality of service countries, a common communication device holding a plurality of profiles is mounted in the vehicles. After the vehicle has been transported to the service country, a worker determines the profile available in the service country from profiles. The inventor has recognized that in a service country, it is desirable for a profile to be determined automatically rather than to be determined by a worker.

The present inventor recognizes such a situation and makes the present disclosure, and an object of the present disclosure is to provide a technology for enabling a profile to be automatically determined at an appropriate place in a communication device that performs wireless communication using any one of the profiles.

An aspect of the present disclosure relates to a communication device mounted in a vehicle. The communication device includes a communication unit that performs wireless communication using any one of a plurality of profiles for using a wireless communication network; a first acquisition unit that acquires travel information of the vehicle; a second acquisition unit that acquires position information of the vehicle; and a controller that controls whether or not to execute a profile determination process based on the acquired travel information and the acquired position information.

According to the aspect, it is possible to determine a profile automatically at an appropriate place based on the travel information and position information of the vehicle.

The controller may execute the profile determination process when a travel distance of the vehicle based on the travel information is equal to or greater than a predetermined distance and a staying period of the position of the vehicle is equal to or longer than a predetermined period.

When the controller executes the profile determination process, the communication unit may transmit the position information of the vehicle to the server using an initially set profile and receive country information corresponding to the position information from the server, and the controller may determine a profile corresponding to the received country information.

A communication speed of the communication unit until the profile is determined may be slower than a communication speed when the profile has been determined.

Another aspect of the present disclosure relates to a method of controlling a communication device. The method is a method of controlling the communication device that performs wireless communication using any one of a plurality of profiles for using a wireless communication network. The method includes a first acquisition step of acquiring travel information of a vehicle in which the communication device is mounted; a second acquisition step of acquiring position information of the vehicle; and a control step of controlling whether or not to execute a profile determination process based on the travel information acquired in the first acquisition step and the position information acquired in the second acquisition step.

According to the present disclosure, it is possible to determine a profile automatically at an appropriate place in a communication device that performs wireless communication using any one of the profiles.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

Figure 1:
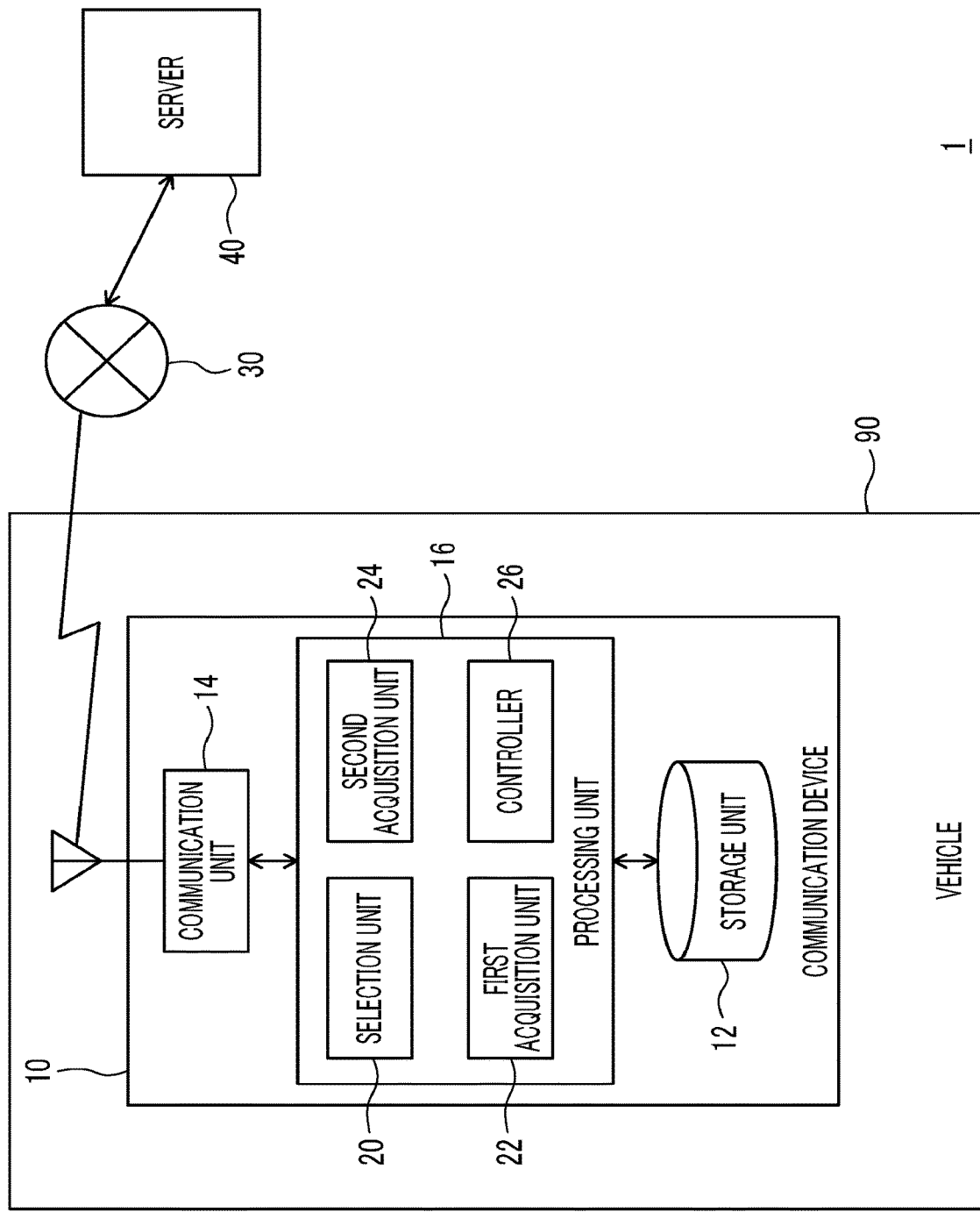
FIG. 1 is a block diagram illustrating a configuration of a vehicle system according to an embodiment.

FIG. 1 is a block diagram illustrating a configuration of a vehicle system 1 according to an embodiment. The vehicle system 1 includes a communication device 10 and a server 40.

The communication device 10 is also called a data communication module (DCM), and is mounted in a vehicle 90 that is a car. Although the communication device 10 is mounted in each of a plurality of vehicles 90 and the vehicle system 1 includes a plurality of communication devices 10, one communication device 10 among the communication devices 10 is illustrated in FIG. 1.

As described above, the vehicle 90 produced in the producing country is transported together with a plurality of other vehicles to any one of a plurality of service countries by the ship and the vehicle carrier via the transit country, and sold in the service country to which the vehicles have been transported. The transit point may also be one of the service countries. The vehicle 90 may be common to the service countries. The communication device 10 is assumed to be common to vehicles 90 for the service countries. In the producing country, power supply to the communication device 10 is started, and thereafter, the power is continuously supplied to the communication device 10 regardless of whether an ignition switch of the vehicle 90 is on or off.

The communication device 10 has a wireless communication function, and is connected to a network 30 via a wireless base station or a wireless access point. A server 40 is connected to the network 30, and the server 40 performs communication with the communication device 10 via the network 30. The server 40 is installed, for example, in a data center in the service country. After the vehicle 90 is sold, the server 40 collects and processes various types of information of the vehicle 90 transmitted from the communication device 10, and transmits various types of information for provision, such as route guidance information and content information to the communication device 10. A standard of the wireless communication is not particularly limited, and includes, for example, 3G (a third generation mobile communication system), 4G (a fourth generation mobile communication system), or 5G (a fifth generation mobile communication system).

The communication device 10 includes a storage unit 12, a communication unit 14, and a processing unit 16. The processing unit 16 includes a selection unit 20, a first acquisition unit 22, a second acquisition unit 24, and a controller 26.

The storage unit 12 stores a plurality of profiles for using a wireless communication network of the communication carrier in advance. Each profile includes information for identifying a communication carrier in the service country. The storage unit 12 stores a profile of each of the service countries in which the vehicle 90 can be sold.

The selection unit 20 selects any one of the profiles in the storage unit 12 and outputs the selected profile to the communication unit 14. The selection unit 20 selects an initially set profile until the profile is determined by the controller 26 as will be described below, and selects a determined profile when the profile is determined by the controller 26.

The communication unit 14 performs wireless communication using any one of the profiles. Specifically, the communication unit 14 performs the wireless communication using the profile output from the selection unit 20. When the communication unit 14 uses the initially set profile, the communication unit 14 can perform the wireless communication in the producing country, the transit country, and another service country through roaming.

The first acquisition unit 22 acquires travel information of the vehicle 90, and outputs the acquired travel information to the controller 26. The travel information includes, for example, an odometer value.

The second acquisition unit 24 periodically acquires position information of the vehicle 90 from a GPS reception unit (not illustrated), and outputs the acquired position information to the controller 26. The position information includes a latitude and a longitude. It is assumed that the communication device 10 does not hold a correspondence relationship between the position information and the country information and cannot specify a country based on the position information. An acquisition frequency of the position information can be appropriately determined by an experiment or the like. The acquisition frequency of the position information when the ignition switch of the vehicle 90 is off may be lower than an acquisition frequency of the position information when the ignition switch is on. Accordingly, it is possible to reduce power consumption.

The controller 26 controls whether or not to execute a profile determination process, based on the travel information output from the first acquisition unit 22 and the position information output from the second acquisition unit 24. Specifically, when a travel distance of the vehicle 90 based on the travel information is equal to or greater than a predetermined distance and a staying period of the position of the vehicle 90 is equal to or longer than a predetermined period, the controller 26 executes a profile determination process. When the condition is not satisfied, the controller 26 does not execute the profile determination process.

The travel distance of the vehicle 90 is, for example, a travel distance of one trip from on to off of the ignition switch of the vehicle 90. The staying period of the position of the vehicle 90 is a period in which the vehicle 90 exists in a predetermined range such as a radius of 1 km. That is, even when the vehicle 90 moves within a vehicle dealer, the vehicle 90 is considered to stay when the vehicle 90 moves within a predetermined range. The controller 26 determines that the staying period of the position of the vehicle 90 is equal to or longer than the predetermined period when a plurality of positions of the vehicle 90 acquired from before a predetermined period to a current time is in the predetermined range.

The travel distance of one trip of the vehicle 90 in the service country is longer than the travel distance of one trip in each of the producing country and the transit country. The staying period of the position of the vehicle 90 in the service country is assumed to be longer than the staying period of the position of the vehicle 90 in each of the producing country and the transit country. The predetermined distance and the predetermined period can be appropriately determined according to a transportation plan of the vehicle 90 or the like so that the profile determination process is executed in the service country and is not executed in countries other than the service country.

When the controller 26 executes the profile determination process, the communication unit 14 transmits the position information of the vehicle 90 to the server 40 using the initially set profile. The server 40 acquires country information corresponding to the received position information based on the correspondence relationship between the position information and the country information held in advance, and transmits the acquired country information to the vehicle 90. The communication unit 14 receives the country information from the server 40 and outputs the received country information to the controller 26. The controller 26 determines a profile corresponding to the country information received by the communication unit 14. The communication unit 14 performs communication using the profile determined by the controller 26.

Although a configuration of the processing unit 16 can be realized by hardware such as a CPU, a memory, or another LSI of any computer and can be realized by software such as a program loaded into the memory, functional blocks realized by cooperation of these are depicted. Therefore, it is understood by those skilled in the art that these functional blocks can be realized in various forms by solely hardware, solely software, or a combination thereof.

Figure 2:
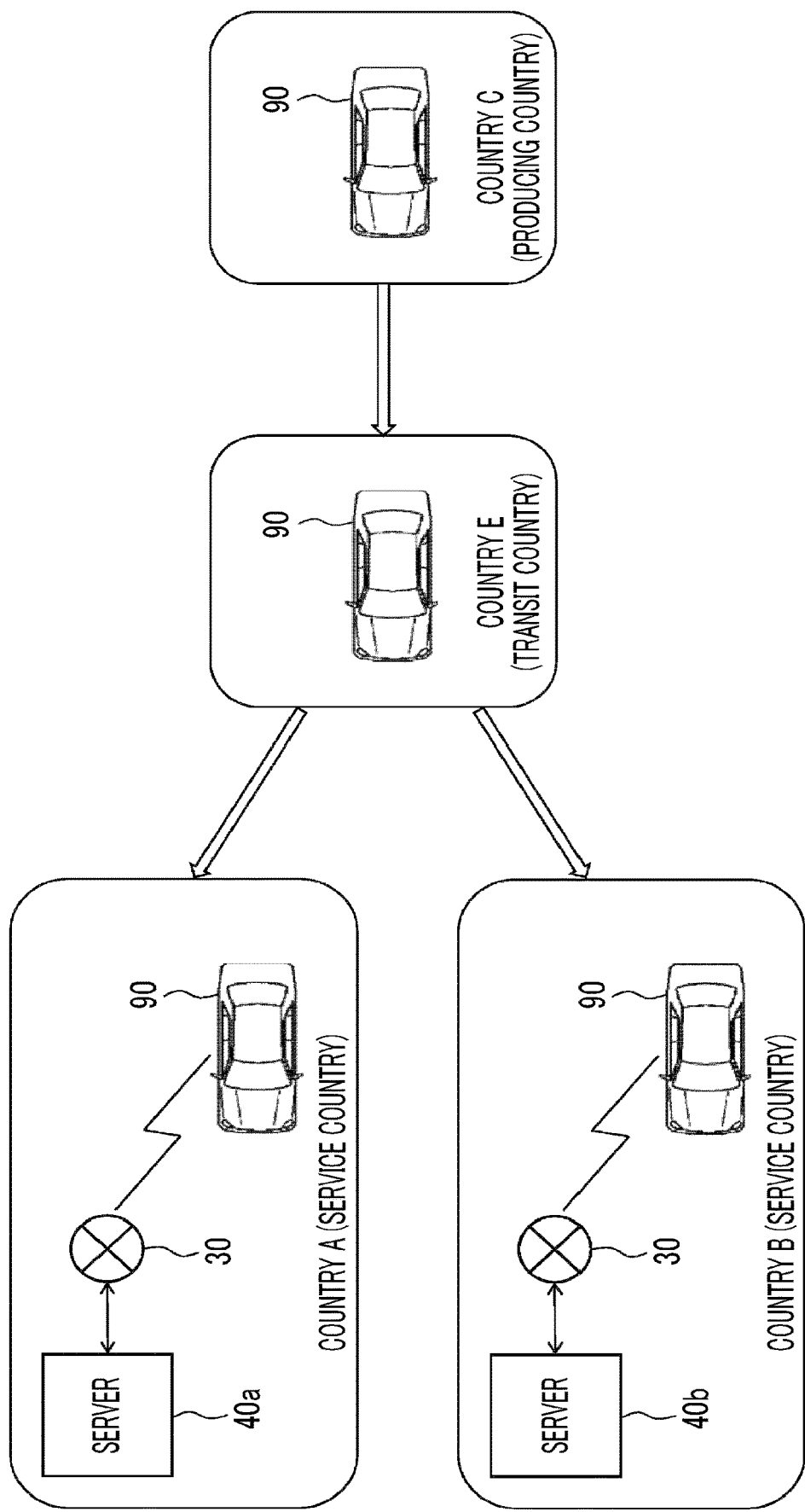
FIG. 2 is a diagram illustrating an operation of the vehicle system of FIG. 1.

Next, an overall operation of the vehicle system 1 having the above configuration will be described. FIG. 2 is a diagram illustrating an operation of the vehicle system 1 in FIG. 1. As an example, it is assumed that the producing country is country C, the transit country is country E, and the service country is any one of country A or country B. In FIG. 2, a transportation path of one vehicle 90 among a plurality of vehicles to be transported simultaneously is illustrated.

The storage unit 12 stores a profile of country A and a profile of country B. It is assumed that the initially set profile is the profile of country A. The predetermined distance for determining whether or not to execute the profile determination process is, for example, 5 km, and the predetermined period is, for example, seven days, but the predetermined distance and the predetermined period are not particularly limited.

In Country C, for example, the vehicle 90 produced at a factory is autonomously moved to a vehicle carrier, is transported to a port by the vehicle carrier, is autonomously moved to a ship at the port, and is loaded onto the ship. In this case, it is assumed that the vehicle 90 travels less than a predetermined distance, for example, tens of meters to hundreds of meters in one trip. Further, the staying period of the position of the vehicle 90 is assumed to be shorter than the predetermined period. It is assumed during transportation by ship that the position of the vehicle 90 continues to move and the staying period thereof is shorter than the predetermined period. It is assumed that some of the vehicles loaded on the ship are transported to country A and the rest are transported to country B.

The vehicle 90 is once transported to country E by the ship, and then, is transported to any one of country A and country B by the same ship. The vehicle 90 may be unloaded from the ship in Country E and loaded on another ship or may be loaded on a vehicle carrier and transported to any one of country A and country B. In this case, it is assumed that the vehicle 90 travels less than a predetermined distance, for example, tens of meters to hundreds of meters in one trip. Further, it is assumed that the staying period of the position of the vehicle 90 is shorter than the predetermined period.

When the vehicle 90 is transported to country A, for example, the vehicle 90 is loaded on a vehicle carrier and transported to a predetermined place. It is assumed that the vehicle 90 then travels a predetermined distance or more, that is, 5 km or more in one trip according to a travel test before sales. It is assumed after a travel test or the like that the vehicle 90 is transported to the vehicle dealer by the vehicle carrier and parked, and the staying period of the position of the vehicle 90 becomes equal to or longer than the predetermined period. Accordingly, the controller 26 executes the profile determination process. Thus, the profile can be automatically determined in the service country based on the travel information and the position information of the vehicle 90. The communication unit 14 transmits the position information of the vehicle 90 to the server 40a using the initially set profile of country A, and receives country information of country A corresponding to the position information from the server 40a. Accordingly, the service country in which the vehicle 90 is located can be specified. The controller 26 determines the profile of country A corresponding to the country information received by the communication unit 14. That is, the initially set profile is determined as it is. Therefore, the profile of country A in which the vehicle 90 is sold can be determined.

Similarly, when the vehicle 90 is transported to country B, it is assumed that the vehicle 90 travels a predetermined distance or more in one trip, and the staying period of the position of the vehicle 90 is equal to or longer than the predetermined period. Accordingly, the controller 26 executes the profile determination process. The communication unit 14 transmits the position information of the vehicle 90 to the server 40b of country B through roaming using the initially set profile of country A, and receives the country information of country B corresponding to the position information from the server 40b. The controller 26 determines the profile of country B corresponding to the country information received by the communication unit 14. That is, swap from the initially set profile of country A to the profile of country B is performed. Therefore, the profile of country B in which the vehicle 90 is sold can be determined.

Regardless of the service country in which the vehicle 90 has been transported, a communication speed of the communication unit 14 until the profile is determined may be slower than a communication speed when the profile has been determined. The communication unit 14 may communicate at a relatively low communication speed such as several kbps or less since the position information of the vehicle 90 and the country information can be communicated until the profile is determined. By setting a roaming communication speed to be low, a contract in which a roaming communication charge has been set to be low is likely to be made between the communication carrier and a manufacturer of the vehicle 90. Further, communication according to the initially set profile may be executable for a short period of time, such as one hour, from communication start. By limiting a period in which communication is possible, a contract in which the roaming communication charge has been set to be lower is likely to be made between the communication carrier and the manufacturer of the vehicle 90.

Since the communication speed of the communication unit 14 when the profile has been determined is faster than the communication speed until the profile is determined, failure such as transmission and reception delay can be suppressed when the communication device 10 transmits various types of information of the vehicle 90 to the server 40 and receives various types of information for provision from the server 40 after the vehicle 90 is sold. Thus, communication can be performed at a communication speed suitable for each of a step of transporting the vehicle 90 and a step of providing a service to the vehicle 90.

Figure 3:
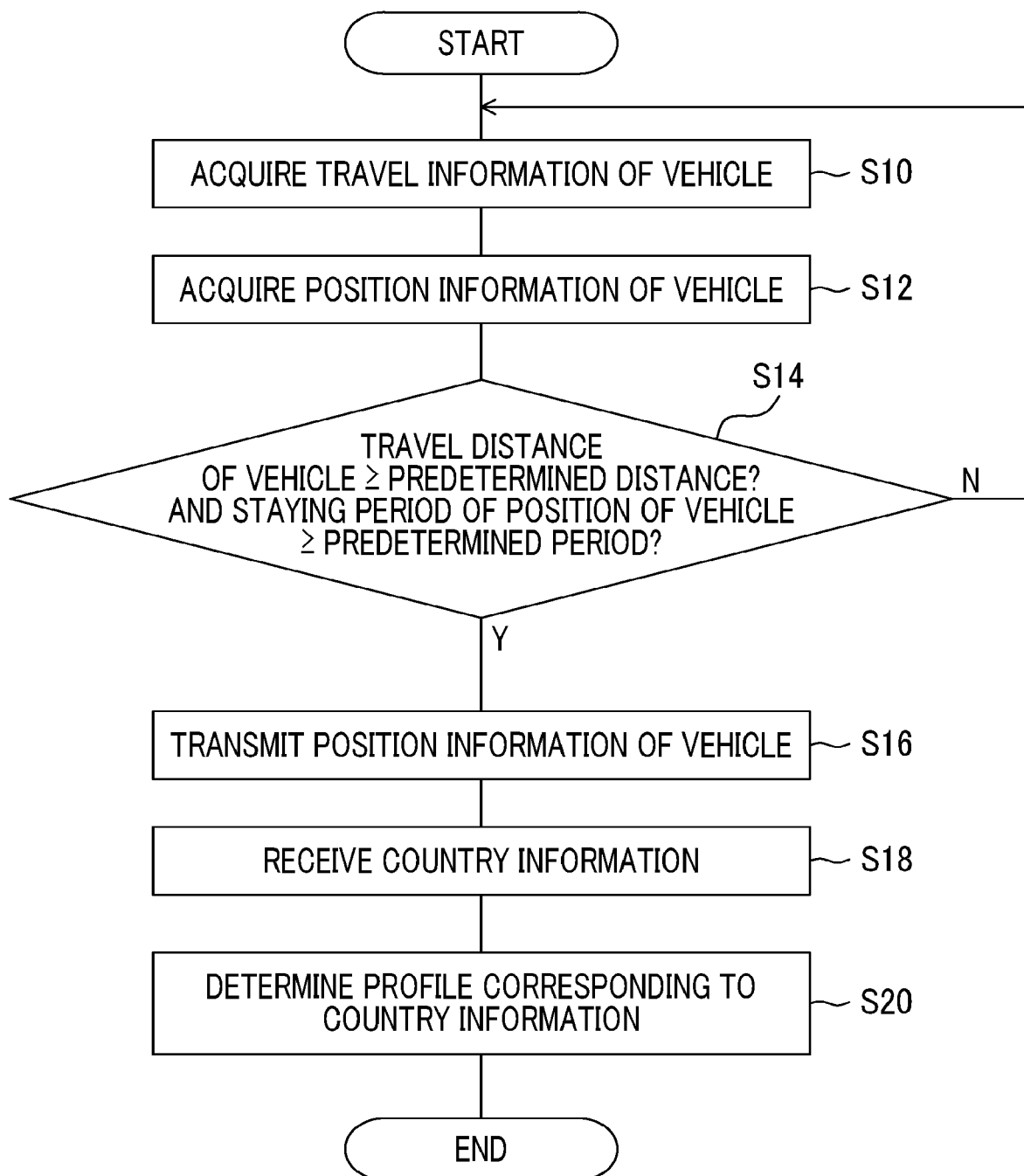
FIG. 3 is a flowchart illustrating a process of a communication device in FIG. 1.

FIG. 3 is a flowchart illustrating a process of the communication device 10 in FIG. 1. The process of FIG. 3 is started when power is supplied to the communication device 10 in the producing country. The first acquisition unit 22 acquires the travel information of the vehicle 90 (S10), and the second acquisition unit 24 acquires the position information of the vehicle 90 (S12). When conditions that the travel distance of the vehicle 90 is equal to or greater than the predetermined distance and the staying period of the position of the vehicle 90 is equal to or longer than the predetermined period are not satisfied (N in S14), the process returns to step S10.

When the travel distance of the vehicle 90 is equal to or greater than the predetermined distance and the staying period of the position of the vehicle 90 is equal to or longer than the predetermined period (Y in S14), the communication unit 14 transmits the position information of the vehicle 90 to the server 40 (S16) and receives the country information from the server 40 (S18). The controller 26 determines a profile corresponding to the received country information (S20) and ends the process.

According to the embodiment, the profile can be automatically determined in the service country in which the vehicle 90 is sold. Therefore, it is not needed for a worker such as a vehicle dealer in the service country to execute profile determination work, and erroneous profile setting and profile setting forgetting can be suppressed, and labor of the work can be reduced.

The present disclosure has been described above based on the embodiment. The embodiment is merely an example, and it is understood by those skilled in the art that various modification examples can be made with respect to a combination of respective components or respective processes, and such modification examples are also within the scope of the present disclosure.

For example, the travel distance of the vehicle 90 may be an integrated travel distance after production. In this case, the predetermined distance can be appropriately determined according to the transportation plan of the vehicle 90 or the like so that the profile determination process is executed in the service country and is not executed in countries other than the service country. According to the modification example, it is possible to cope with a transportation plan different from that of the embodiment. It is also possible to improve a degree of freedom of a configuration of the communication device 10.

What is claimed is:

1. A communication device mounted in a vehicle, the communication device comprising:
    a communication interface that performs wireless communication using any one of a plurality of profiles for using a wireless communication network; and
    processing circuitry that
    acquires travel information of the vehicle, the travel information of the vehicle including a travel distance of the vehicle;
    acquires position information of the vehicle; and
    whether or not to execute a profile determination process based on the acquired travel information and the acquired position information,
    wherein the processing circuitry executes the profile determination process when the travel distance of the vehicle based on the travel information is equal to or greater than a predetermined distance and a staying period of the position of the vehicle is equal to or longer than a predetermined period.

2. The communication device according to claim 1, wherein:
    when the processing circuitry executes the profile determination process, the communication interface transmits the position information of the vehicle to a server using an initially set profile and receives country information corresponding to the position information from the server; and
    the processing circuitry determines a profile corresponding to the received country information.

3. The communication device according to claim 1, wherein a communication speed of the communication interface until the profile is determined is slower than a communication speed of the communication interface when the profile has been determined.

4. A method of controlling a communication device that performs wireless communication using any one of a plurality of profiles for using a wireless communication network, the method comprising:
    acquiring, with circuitry, travel information of a vehicle in which the communication device is mounted, the travel information including a travel distance of the vehicle;
    acquiring, with the circuitry, position information of the vehicle; and
    controlling, with the circuitry, whether or not to execute a profile determination process based on the travel information and the position information,
    wherein the method further comprises executing the profile determination process when the travel distance of the vehicle based on the travel information is equal to or greater than a predetermined distance and a staying period of the position of the vehicle is equal to or longer than a predetermined period.

5. The method according to claim 4, further comprising:
    executing the profile determination process;
    transmitting the position information of the vehicle to a server using an initially set profile and receives country information corresponding to the position information from the server; and
    determining a profile corresponding to the received country information.

* * * * *